United States Patent
Tai

(10) Patent No.: US 9,738,060 B2
(45) Date of Patent: Aug. 22, 2017

(54) PROCESS OF MANUFACTURING A WATERPROOF ENCLOSURE

(71) Applicant: Chien-Yu Tai, Taipei (TW)

(72) Inventor: Chien-Yu Tai, Taipei (TW)

( * ) Notice: Subject to any disclaimer, the term of this patent is extended or adjusted under 35 U.S.C. 154(b) by 281 days.

(21) Appl. No.: 14/733,982

(22) Filed: Jun. 9, 2015

(65) Prior Publication Data
US 2015/0266282 A1    Sep. 24, 2015

(51) Int. Cl.
*A41B 13/04* (2006.01)
*B32B 3/00* (2006.01)
*B65B 11/00* (2006.01)
*B29C 65/00* (2006.01)
*B32B 37/00* (2006.01)
*B32B 38/04* (2006.01)
*B32B 7/14* (2006.01)
(Continued)

(52) U.S. Cl.
CPC ........ *B32B 37/185* (2013.01); *B32B 37/1207* (2013.01); *B29C 65/02* (2013.01); *B29C 65/4815* (2013.01); *B29C 65/749* (2013.01); *B29C 66/0326* (2013.01); *B29C 66/21* (2013.01); *B29C 66/24244* (2013.01); *B29C 66/433* (2013.01); *B29C 66/73187* (2013.01); *B32B 37/1292* (2013.01); *B32B 2307/7265* (2013.01); *B32B 2439/40* (2013.01)

(58) Field of Classification Search
CPC ......... B29C 65/00; B29C 65/02; B29C 65/18; B29C 65/48; B29C 65/4815; B29C 65/74; B29C 65/7419; B29C 65/749; B29C 66/00; B29C 66/0326; B29C 66/21; B29C 66/242; B29C 66/24244; B29C 66/43; B29C 66/433; B29C 66/73187; B32B 37/00; B32B 37/0076; B32B 37/02; B32B 37/04; B32B 37/06; B32B 37/065; B32B 37/1207; B32B 37/1215; B32B 37/1223; B32B 37/142; B32B 37/182; B32B 37/185; B32B 38/0004; B32B 38/105; B32B 2038/047
USPC ....... 156/60, 69, 70, 90, 250, 252, 256, 264, 156/267, 272.2, 275.1, 290, 291, 303.1, 156/308.2, 308.4, 309.6, 312, 324.4, 156/331.7
See application file for complete search history.

(56) References Cited

U.S. PATENT DOCUMENTS

| | | | | |
|---|---|---|---|---|
| 3,269,278 A | * | 8/1966 | Olstad | B31B 19/00 156/271 |
| 4,648,931 A | * | 3/1987 | Johnston | B29C 65/02 156/251 |

(Continued)

*Primary Examiner* — Philip Tucker
*Assistant Examiner* — Brian R Slawski

(57) ABSTRACT

A process of manufacturing a waterproof enclosure and sealing the waterproof enclosure includes the steps of forming a rectangular waterproof upper member and a rectangular waterproof lower member; forming four rectangular adhesive members; securing the adhesive members to the lower member by pressing and heating; securing three edges of the upper member to the lower member by pressing and heating to form a partially open enclosure having an open edge; punching a plurality of positioning holes on a periphery of the partially open enclosure; placing an article in the partially open enclosure by inserting the article through the open edge of the partially open enclosure; sealing the open edge of the partially open enclosure by pressing and heating to form a sealed enclosure; and cutting the periphery having the positioning holes to finish a waterproof enclosure.

1 Claim, 6 Drawing Sheets

(51) Int. Cl.
*C09J 5/00* (2006.01)
*B32B 37/18* (2006.01)
B32B 37/12 (2006.01)
B29C 65/74 (2006.01)
B29C 65/02 (2006.01)
B29C 65/48 (2006.01)

(56) References Cited

U.S. PATENT DOCUMENTS

| | | | | |
|---|---|---|---|---|
| 4,849,040 A | * | 7/1989 | Wood | B29C 66/71 |
| | | | | 156/204 |
| 2001/0036496 A1 | * | 11/2001 | Recchia, Jr. | B65B 9/02 |
| | | | | 426/411 |
| 2011/0192736 A1 | * | 8/2011 | Perell | B29C 66/1122 |
| | | | | 206/223 |

\* cited by examiner

PROCESS OF MANUFACTURING A WATERPROOF ENCLOSURE

BACKGROUND OF THE INVENTION

1. Field of the Invention

The invention relates to waterproof enclosure and more particularly to a process of manufacturing a waterproof enclosure and sealing an electronic device with the waterproof enclosure.

2. Description of Related Art

A conventional waterproof device for protecting an electronic device comprises a wearable article having a waterproof enclosure; a rigid frame attached to the enclosure, the rigid frame defining an opening larger than a cross-section of the electronic device; and a rigid cover coupled to the rigid frame, the cover being movable between an open position in which the cover is disposed away from the opening, and a closed position in which the cover forms a waterproof seal with the frame.

While the device enjoys its success in the market, continuing improvements in the exploitation of waterproof device for electronic device are constantly sought.

SUMMARY OF THE INVENTION

It is therefore one object of the invention to provide a process of manufacturing a waterproof enclosure and sealing the waterproof enclosure comprising the steps of forming a rectangular waterproof upper member and a rectangular waterproof lower member; forming four rectangular adhesive members; securing the adhesive members to the lower member by pressing and heating; securing three edges of the upper member to the lower member by pressing and heating to form a partially open enclosure having an open edge; punching a plurality of positioning holes on a periphery of the partially open enclosure; placing an article in the partially open enclosure by inserting the article through the open edge of the partially open enclosure; sealing the open edge of the partially open enclosure by pressing and heating to form a sealed enclosure; and cutting the periphery having the positioning holes to finish a waterproof enclosure.

The above and other objects, features and advantages of the invention will become apparent from the following detailed description taken with the accompanying drawings.

DETAILED DESCRIPTION OF THE INVENTION

Figure 1:
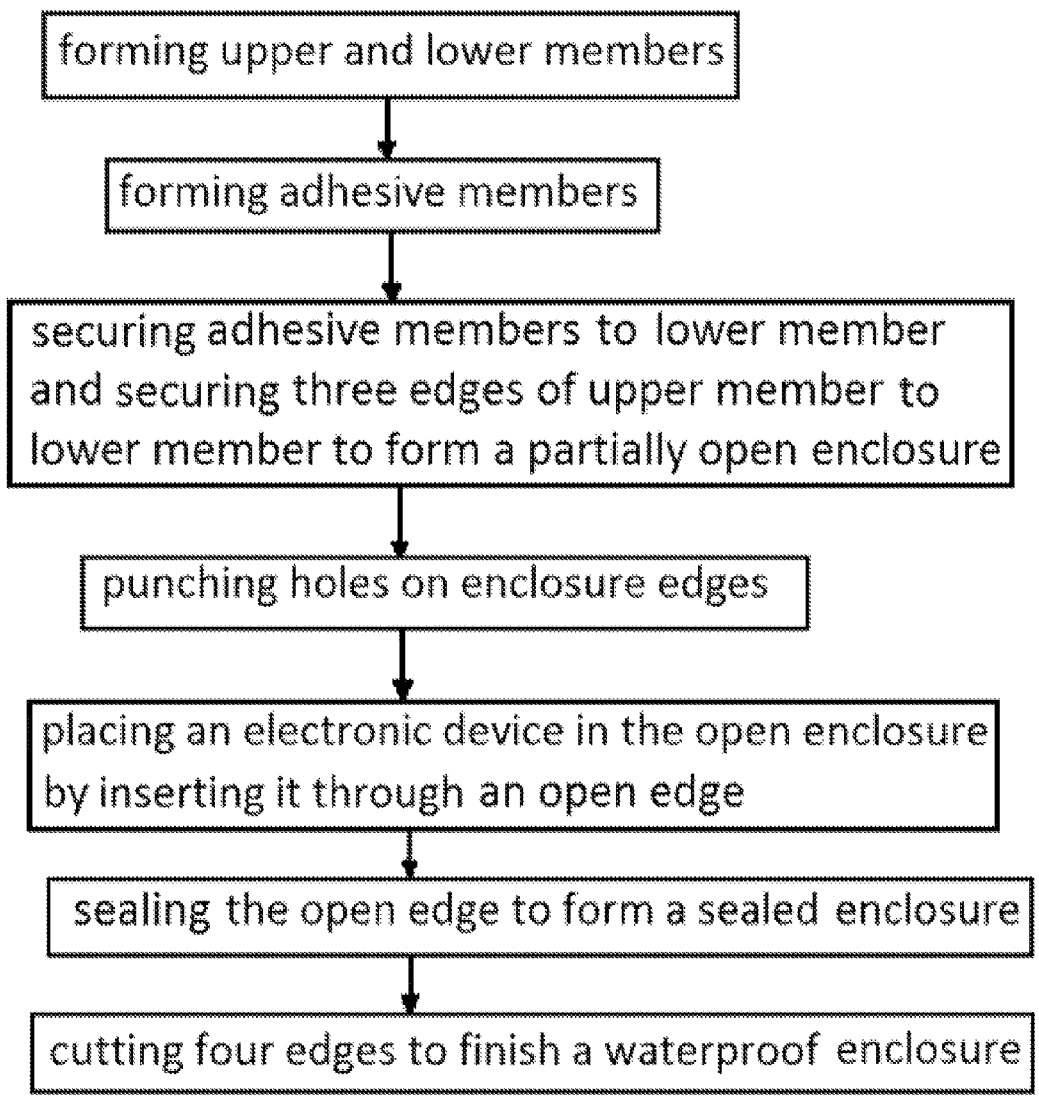
FIG. 1 is a flow chart of a process of manufacturing a waterproof enclosure and sealing an electronic device with the waterproof enclosure according to the invention.
Figure 2:
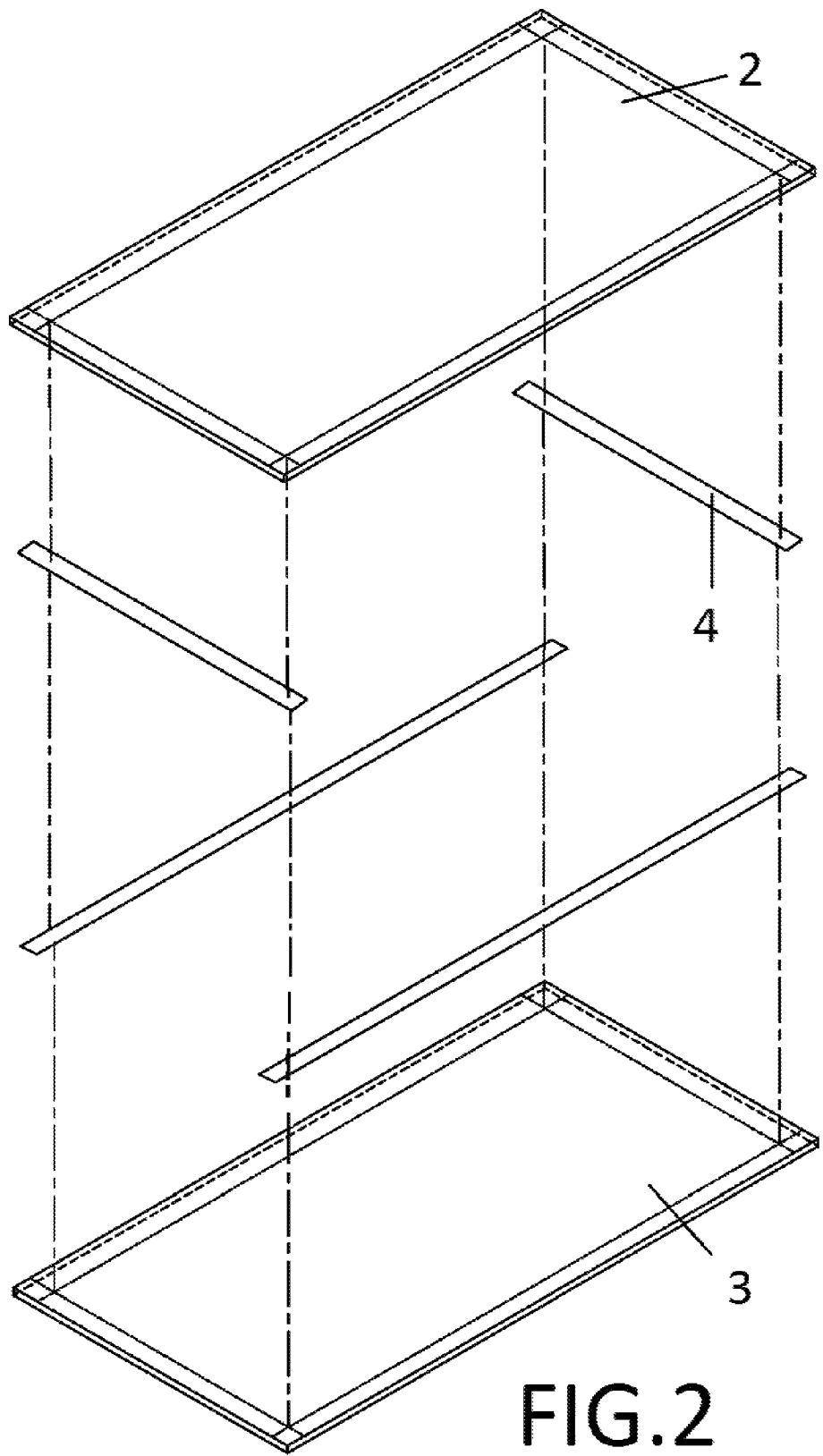
FIG. 2 is an exploded view showing a rectangular waterproof upper member, a rectangular waterproof lower member, and four rectangular adhesive members.

Referring to FIGS. 1 to 6, a process of manufacturing a waterproof enclosure and sealing an electronic device with the waterproof enclosure in accordance with the invention is illustrated. The process comprises the following steps:

Forming a rectangular waterproof upper member 2 made of flexible material (e.g., plastic) and a rectangular waterproof lower member 3 made of flexible material (e.g., plastic) is shown in FIG. 2.

Forming four rectangular adhesive members 4 made of PU (polyurethane) is shown in FIG. 2.

Figure 3:
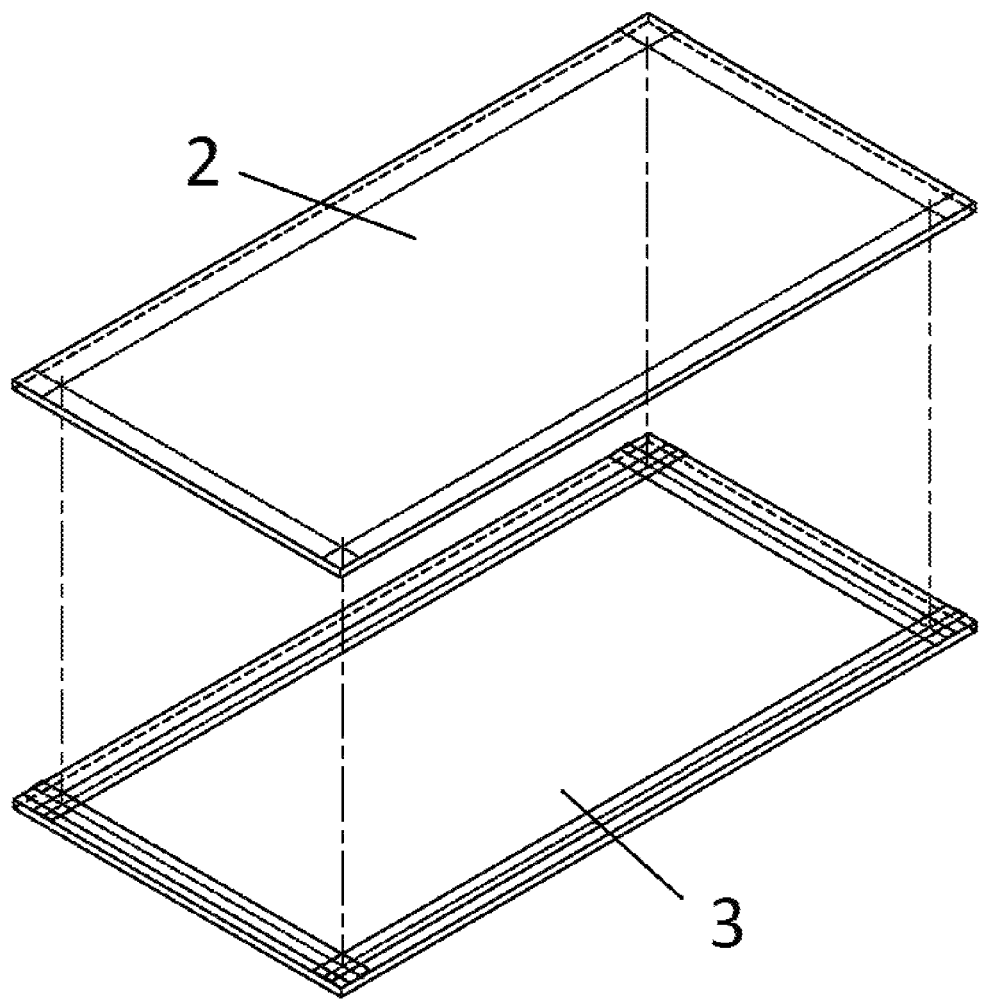
FIG. 3 is an exploded view showing pressing the adhesive members on the lower member and pressing the upper member on the lower member.
Figure 4:
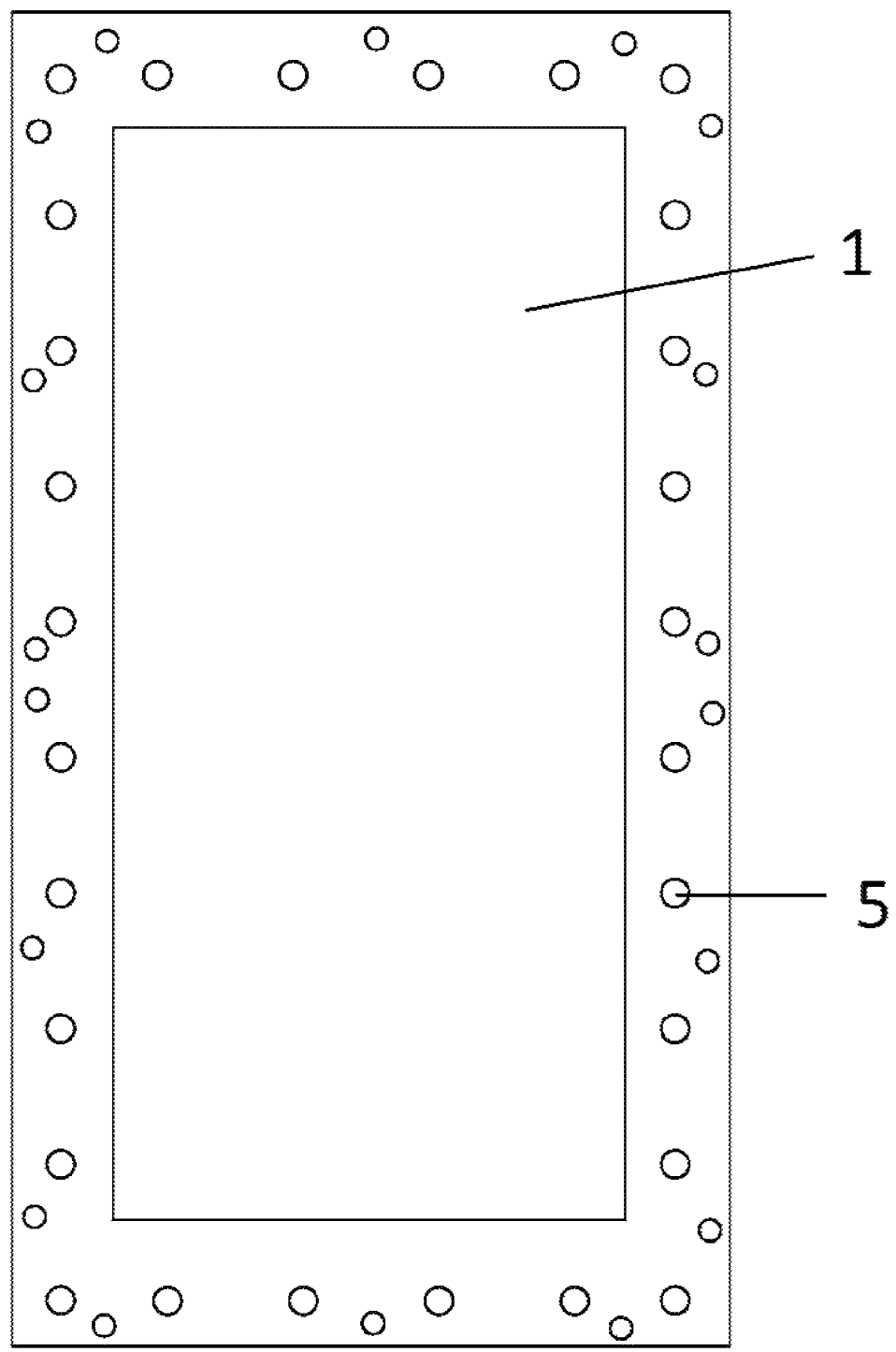
FIG. 4 is a top plan view showing positioning holes formed on four edges of the open enclosure by punching.

Securing the adhesive members 4 to the lower member 3 by pressing and heating and securing three edges of the upper member 2 to the lower member 3 by pressing and heating to form a partially open enclosure 1 having an opening 11 at one edge is shown in FIGS. 3 and 4.

Punching a plurality of positioning holes 5 on four edges of the partially open enclosure 1 is shown in FIG. 4.

Figure 5:
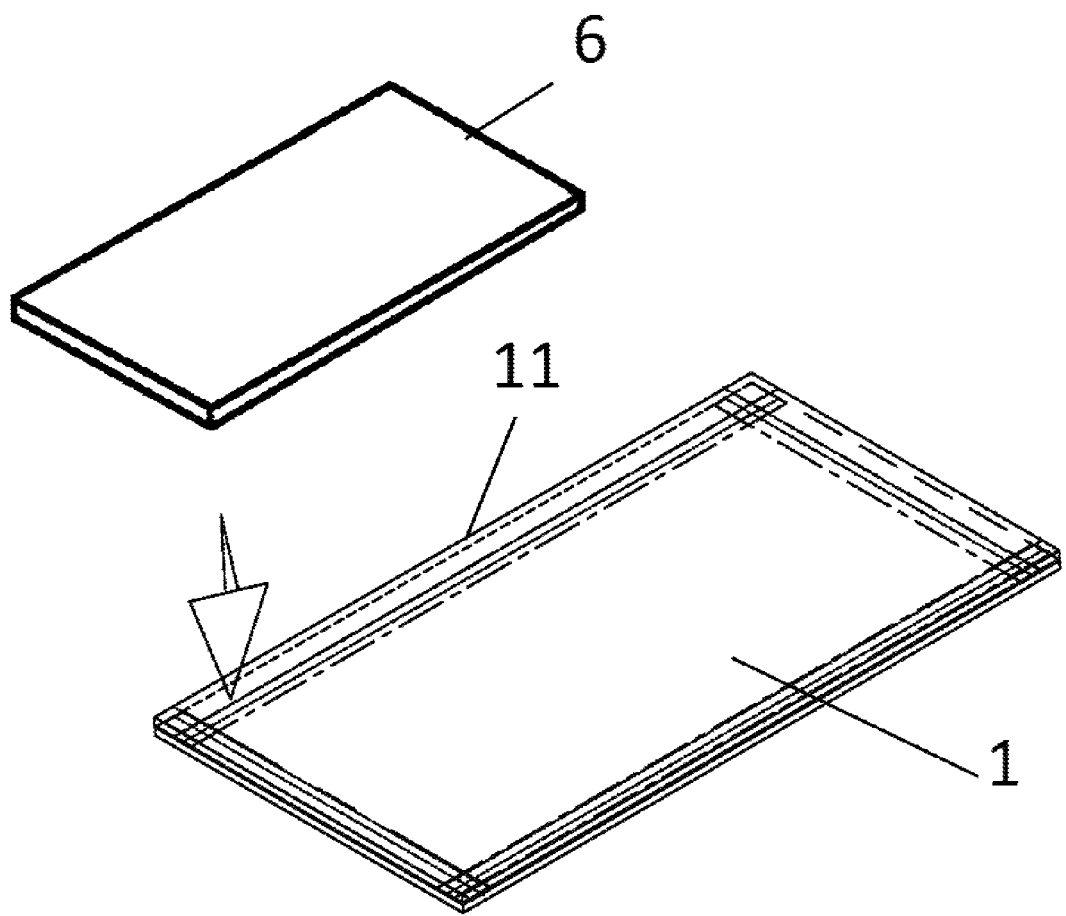
FIG. 5 is a perspective view showing placing an electronic device in the open enclosure by inserting the electronic device through the opening.

Placing an electronic device 6 in the partially open enclosure 1 by inserting the electronic device 6 through the opening 11 is shown in FIG. 5.

Sealing the open edge 11 of the partially open enclosure 1 by pressing and heating to form a sealed enclosure 1 is described.

Figure 6:
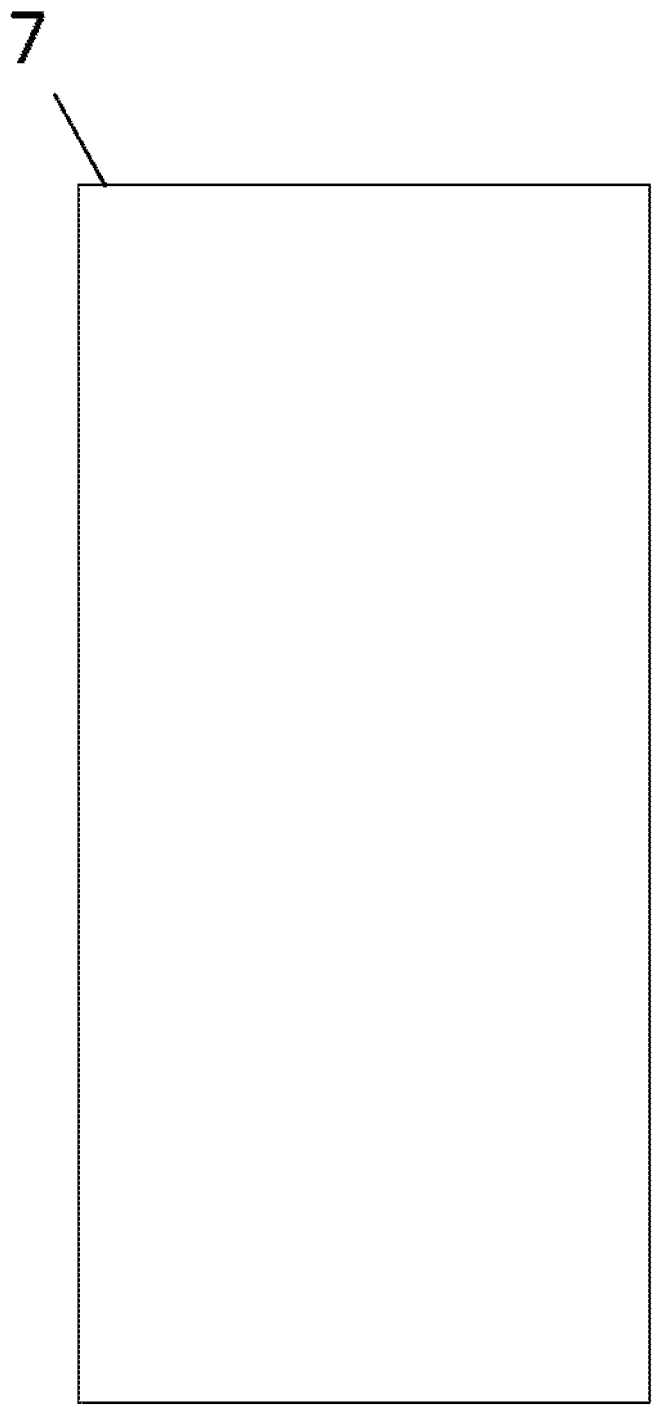
FIG. 6 is a perspective view of a waterproof enclosure formed by cutting the edges of a sealed enclosure.

Finally, cutting the four edges containing the positioning holes 5 to finish a waterproof enclosure 7 is shown in FIG. 6.

While the invention has been described in terms of preferred embodiments, those skilled in the art will recognize that the invention can be practiced with modifications within the spirit and scope of the appended claims.

What is claimed is:

1. A process of manufacturing a waterproof enclosure and sealing the waterproof enclosure comprising the steps of:
    forming a rectangular waterproof upper member and a rectangular waterproof lower member;
    forming four rectangular adhesive members;
    securing the adhesive members to the lower member by pressing and heating;
    securing three edges of the upper member to the lower member by pressing and heating to form a partially open enclosure having an open edge;
    punching a plurality of positioning holes on a periphery of the partially open enclosure;
    placing an article in the partially open enclosure by inserting the article through the open edge of the partially open enclosure;
    sealing the open edge of the partially open enclosure by pressing and heating to form a sealed enclosure; and
    cutting the periphery having the positioning holes to finish a waterproof enclosure.

* * * * *